Figure 1:
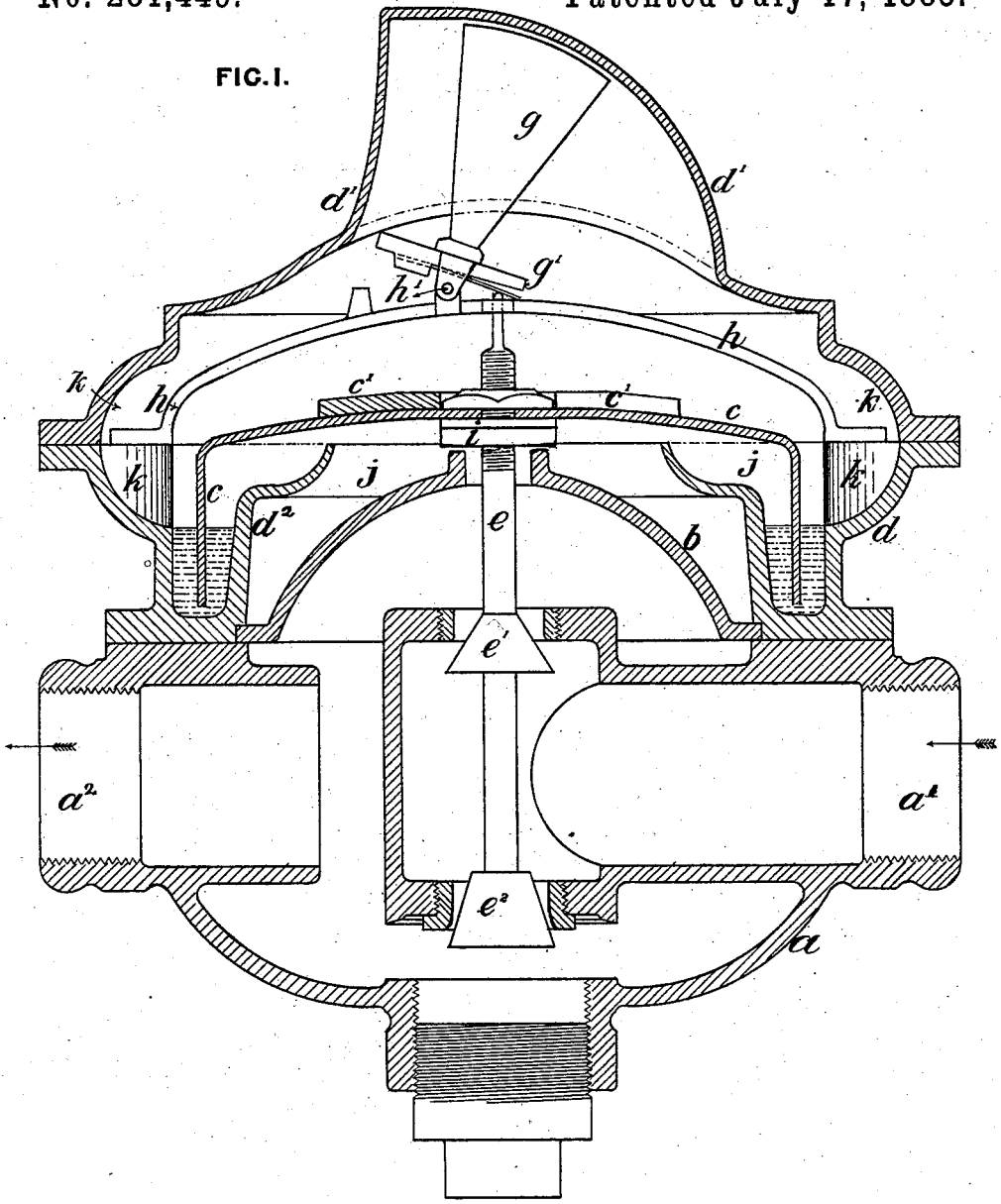

(No Model.)

W. CARTER.
GAS REGULATOR.

No. 281,449. Patented July 17, 1883.

Witnesses
George Tilghman
H. A. Daniels

Inventor
William Carter
by Wm H Babcock
Attorney

N. PETERS, Photo-Lithographer, Washington, D. C.

UNITED STATES PATENT OFFICE.

WILLIAM CARTER, OF OLDHAM, COUNTY OF LANCASTER, ENGLAND.

GAS-REGULATOR.

SPECIFICATION forming part of Letters Patent No. 281,449, dated July 17, 1883.

Application filed April 23, 1883. (No model.) Patented in England May 27, 1881, No. 2,343.

*To all whom it may concern:*

Be it known that I, WILLIAM CARTER, of Oldham, in the county of Lancaster, England, have invented certain new and useful Improvements in Gas-Regulators, (for which I have obtained a patent in Great Britain, No. 2,343, bearing date May 27, 1881,) of which the following is a specification.

My invention relates to improvements in gas-regulators which have troughs containing mercury for a seal for the gas around the edge of an inverted cup or float; and the objects of my invention consist, in the first place, of an improvement in the form of valves for controlling the flow of gas, known as "equilibrium-valves," having reference to a combination of valves and valve-seats of such form that the motion or pressure of the gas passing through the valve-seats shall have no tendency to open or close or retard the opening or closing of the valves; and also in making one valve in the combination of such shape as will prevent the least tendency of the valves to stick in the seat, and the other valve so shaped as to be a guide to the valve-spindle and float, at the same time that the shape of both valves is so arranged as to provide a proportionate opening for the passage of the gas with a relative amount of drop of float.

The second part of my invention provides for a defect in pressure-regulators with a mercury-seal which arises through a cup or float being immersed to different depths in the mercury, thereby causing a continually-altering weight upon the float, which should be uniform. To correct this I provide an accelerating weighting contrivance, formed, by preference, of a pivoted lever, the vertical arm of which is weighted, and the horizontal arm rests on or is connected to the valve-spindle, so that as the float falls a greater weight is thrown upon it, and as it rises the weight is automatically taken off the float and supported by the pivot.

The third part of my invention has for its object making the regulator gas-safe in case of accident to the float, or when the mercury, by accident, oxidation, or otherwise, gets below its proper level, in which case, in regulators hitherto made, the gas would escape around the lip of the float, and so might cause a dangerous explosion. I prevent this by contracting the aperture which supplies gas to the float to a small opening around the valve-spindle, and fixing upon the spindle a washer or disk which shall (when the float by any of the causes above named is not supported by the pressure of gas) rest upon the contracted opening, and so far close it that no dangerous escape of gas can take place.

The fourth part of my invention has for its object the prevention of spilling of mercury, either outside of the governor or into the gas-passages.

I attain these objects by the mechanism illustrated in the accompanying sheet of drawings, in which—

Figure 2:
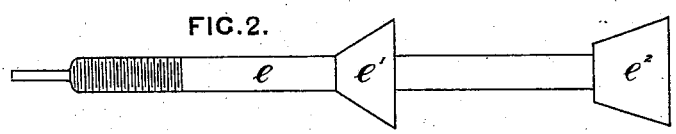

Figure 1 is an elevation, partly in section, of the gas-regulator; and Fig. 2 is a detached view of the valve-spindle $e$ and valves $e'$ and $e^2$.

$a$ is the shell or case of a gas-regulator, formed of metal or other suitable material, which contains the valves and valve-seatings and forms the ingress $a'$ and egress $a^2$ for the gas. On the shell $a$ is fitted the circular plate $b$, through the opening in which the gas passes to the float or cup $c$. The float $c$ has a removable weight, $c'$, placed upon it. The rim of this float rests in mercury contained in a trough or channel in the annular casting $d$, which is screwed to the shell $a$ and secures the plate $b$. To prevent the mercury spilling I make the two sides of the channel for the mercury of different heights, the inner side, $d^2$, being the higher, and I curve the outer side outward and upward, so as to form a relief-space, $k$, running round the outer edge of the channel, below the level of its inner side, $d^2$. The annular relief-space $k$, thus formed, is above the trough containing the mercury, and exterior thereto. When the regulator is turned upon its side, the mercury fills the relief-space $k$, and is thereby prevented from running into the inner part of the regulator, and so into the gas-pipes.

$e$ is the valve-spindle, on which are fixed the equilibrium-valves $e'$ and $e^2$. The float $c$ is fixed to the valve-spindle $e$ and can rise or fall quite freely with it. I make the upper valve, $e'$, of such shape as will prevent the least tendency of the valves to stick in the seat, and for this purpose I find that the sides of the upper valve should each form an angle of about forty degrees with the spindle. The lower or guide-valve, $e^2$, is made to taper less than the upper valve, $e'$, so as to be a guide for the valve-spindle $e$ and float $c$, and for this purpose I find that the sides should each form an angle of about twenty degrees with the spindle. The lower valve, $e^2$, is fixed, so that its upper side cannot fall below the level of its seating. This is to insure its acting as a guide to the valve-spindle at all times. A disk or washer, $i$, surrounds spindle $e$ just below float $c$, and closes the opening in plate $b$ whenever said float descends sufficiently. Of course this closing action takes place sooner than if there were nothing between said plate and said float, and said disk therefore affords a guard against the escape of gas under the edges of the float, or through a fracture in the same. This closing is almost instantaneous when such fracture or the giving out of the mercury in the trough allows the gas to escape from space $j$. A weighted lever, $g$, is pivoted at $h'$ to a projection on the cross-stay or bridge $h$, in which is a hole to serve as a guide for the valve-spindle $e$. The cross-stay $h$ is fixed on projections on the casting $d$. $h^2$ is a projection on the cross-stay $h$, which forms a stop for the arm $g'$, and prevents the weight $g$ from swinging over its center. $k$ is the relief-space, which extends round the casting $d$, which is connected to the top piece, $d'$, which forms part of the relief-space, into which the mercury runs should the regulator be turned on its side during transit, or when being fixed in its place.

My improved regulator may be made of metal or other material, and the float and mercury-channel may be enameled, or may be made of glass or earthenware, and the shape may be varied, if desired.

When the gas is admitted at $a'$, it passes the valves $e'$ and $e^2$ and out at $a^2$. Some of the gas enters the chamber $j$ above by passing through the opening in the plate $b$ and under the disk or washer $i$, fills the chamber $j$ and lifts the float $c$ and valve-spindle $e$, if the pressure be sufficiently great. As the float $c$ is lifted it raises the arm $g'$ of the weighted lever $g$, thereby throwing the weight on the fulcrum, and thus lessening the pressure on the valve-spindle $e$ as the float $c$ is raised farther out of the mercury, so that an equal or nearly equal weight bears upon the spindle $e$, to whatever depth the rim of the float $c$ is immersed in the mercury. Whenever the consumption of gas is increased by a greater number of lights being brought into use, the pressure is for the moment reduced under the float $c$, which then falls, opens the valves $e'$ and $e^2$, and allows the required quantity of gas to flow through. Whenever a reduction is made in the number of lights used, the consumption of gas decreases and the pressure under the float $c$ increases, thereby causing it to rise and cut off excess pressure by partially closing the valves $e'$ and $e^2$, thus tending to equalize the pressure of gas at the burners, to maintain a steady light, and lessen the consumption of gas. I thus obtain a regulator so highly sensitive that if one hundred and ninety-nine lights out of two hundred lights governed were to be suddenly turned off the one remaining light would show no increase of pressure.

Having stated the nature of my invention and described the manner of performing the same, what I desire to claim, and secure by Letters Patent of the United States, is—

1. In a gas-regulator, the valve-spindle $e$ and the tapering valves $e'$ and $e^2$, attached thereto, in combination with upper and lower valve-seats, the upper valve having a greater inclination than the lower valve, and the latter serving as a guide, substantially as set forth.

2. In a gas-regulator, the combination of a valve-spindle, a float attached thereto, and a mercury-trough, into which the edge of said float dips, as stated, with a lever, $g'$, having one end arranged to bear against the top of said spindle, and a weight, $g$, attached to said lever, above the pivot thereof, and operating to force said end of the lever downward with increasing pressure as the float and spindle descend, substantially as set forth.

3. In a gas-regulator, the combination of float $c$ and valve-spindle $e$ with washer $i$, secured to said spindle between the float and the opening in the plate below, through which the gas passes to act on said float, substantially as set forth.

The foregoing specification of my improvements in gas-regulators signed by me this 12th day of April, 1883.

WILLIAM CARTER.

Witnesses:
H. B. BARLOW,
S. WALKEY GILLETT,
Both of 4 Mansfield Chambers, 17 St. Ann's Square, Manchester.